Oct. 4, 1932.  L. C. SMITH  1,881,143
ATTACHMENT FOR VEHICLES AND THE LIKE
Filed Jan. 16, 1931  2 Sheets-Sheet 1
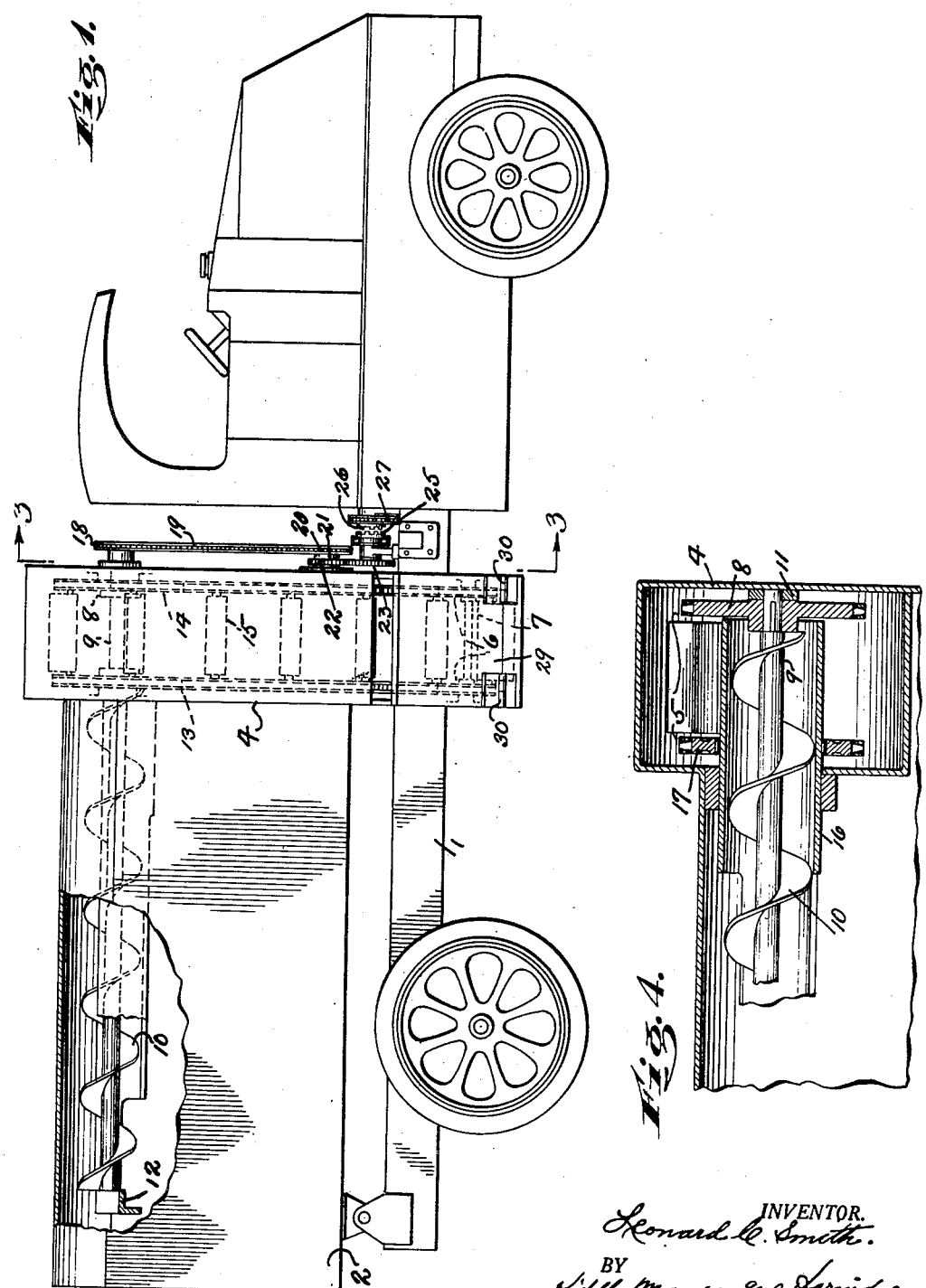
INVENTOR.
Leonard C. Smith.
BY
Riddle, Margeson and Horridge.
ATTORNEYS.

Oct. 4, 1932.  L. C. SMITH  1,881,143
ATTACHMENT FOR VEHICLES AND THE LIKE
Filed Jan. 16, 1931   2 Sheets-Sheet 2
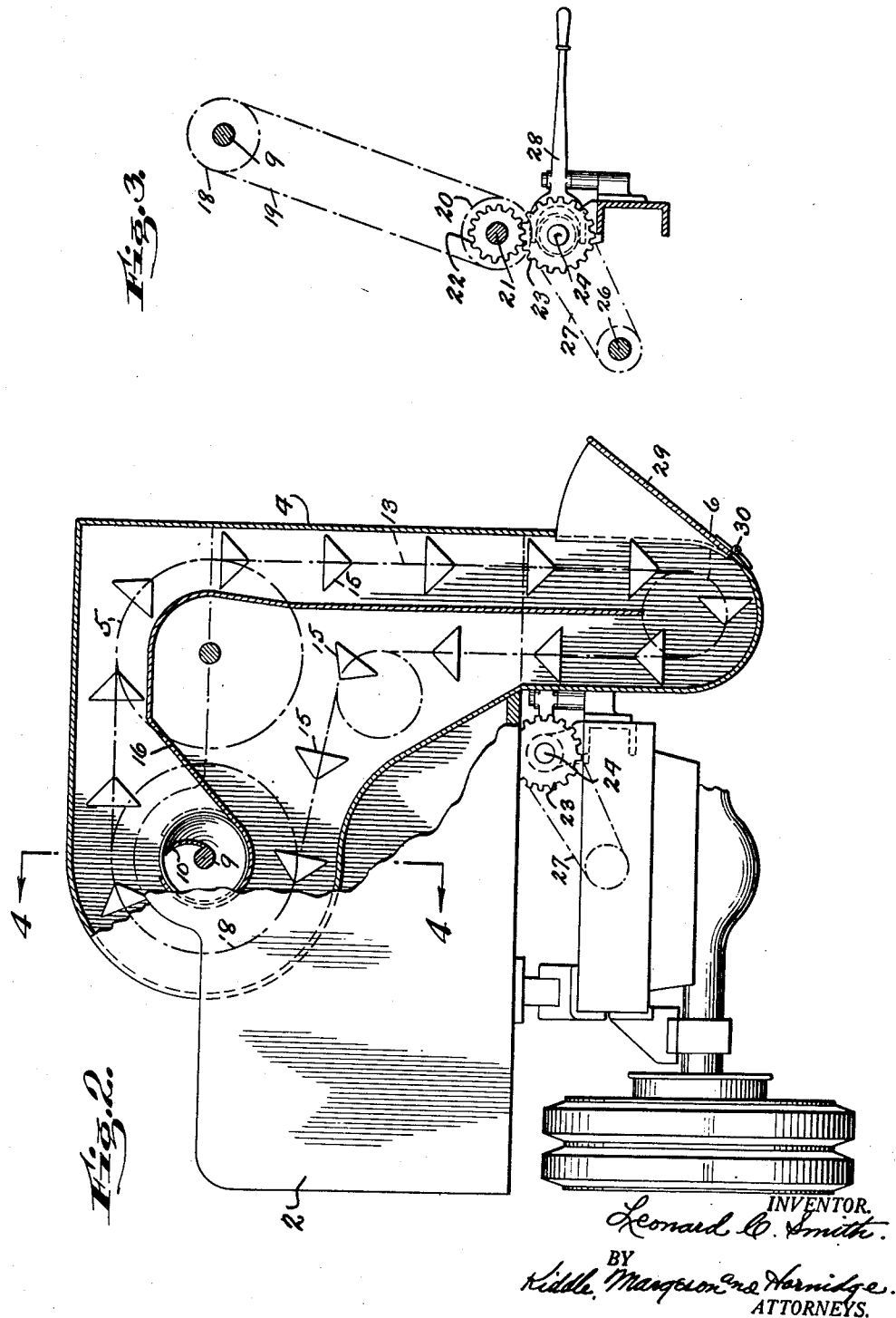
INVENTOR.
Leonard C. Smith.
BY
Kiddle, Margeson and Hornidge.
ATTORNEYS.

Patented Oct. 4, 1932

1,881,143

UNITED STATES PATENT OFFICE

LEONARD C. SMITH, OF NEW YORK, N. Y.

ATTACHMENT FOR VEHICLES AND THE LIKE

Application filed January 16, 1931. Serial No. 509,191.

This invention is directed to an improvement in attachments for vehicles and the like and is particularly directed to a combined elevator and conveyor adapted as above noted for attachment to a vehicle such as a truck whereby material may be elevated into the body of the truck and be distributed by the conveyor within the body.

A further object of my invention is the provision of a construction which will be simple and inexpensive and which may be attached without prohibitive expense to existing truck bodies.

A further object of my invention is to provide a construction of the character above indicated which will eliminate the necessity of workmen trimming the load in the truck and the necessity of the workmen raising the material to the top of the truck body.

Referring to the drawings in detail:

Fig. 1 is an elevational view partly in section showing my improved apparatus applied to a truck;

Fig. 2 is an end view also partly in section;

Fig. 3 is a section on the line 3—3 of Fig. 1; and

Fig. 4 is a section on the line 4—4 of Fig. 2.

Referring to the drawings in detail, 1 designates the chassis and 2 the body of a truck to which my invention is adapted to be applied.

4 designates an elevator housing which is adapted to be attached in any convenient manner to the body of a vehicle. As illustrated a section of the side and front wall of the body 2 of the truck is cut away to receive this housing, the housing being set into the opening thus provided. As will be seen from Fig. 1 the upper end of the housing extends upwardly at least as high as the top of the body 2.

Within the elevator housing are two sets of sprockets, an upper set 5 and a lower set 6. The lower set of sprockets 6 is supported on a shaft 7 adjacent the lower part of the housing 4.

One of the sprockets 8 of the upper sprockets is keyed to the drive shaft 9 of a conveyor 10. This conveyor as will be seen from Fig. 1, for instance, extends lengthwise of the truck body and at right angles to the housing 4. The drive shaft 9 is supported in bearings 11 and 12, the latter being provided in a brace extending across the truck body 2.

The upper sprockets 5 and lower sprockets 6 support elevator chains 13 and 14, these chains carrying elevator buckets 15 pivoted thereon. The sprocket 8 which is keyed to the drive shaft 9 of the conveyor as above pointed out constitutes a drive sprocket for the elevator.

Adjacent the upper end of the elevator is an inclined plate and conveyor tube 16 and as the buckets 15 dump the material at the top of their travel about the sprockets 5 this material will be directed by this plate 16 which is inclined toward the conveyor into the conveyor, the conveyor in turn distributing or trimming the material along the inside of the truck body.

As will be seen from Figs. 2 and 4 the member 16 provides a bearing for the sprocket 17 of the upper elevator sprockets, this sprocket 17 as will be understood being mounted for rotation on the plate.

The outer end of the drive shaft 9 carries a sprocket 18 and this sprocket in turn carries a chain 19 the lower end of which is supported by a sprocket 20. This sprocket 20 is on a shaft 21 carrying a gear 22 meshing with a gear 23. The gear 23 is mounted on a stub shaft 24 which carries one member 25 of a dog clutch, the other member 26 of this clutch being mounted on a shaft driven by a chain 27 through the medium of the motor of the truck for instance, or any other motor desired. The clutch is operated by a lever 28.

Adjacent the lower end of the elevator housing 4 is a hopper 29 hinged at 30 so that the same may be closed when my apparatus is not in use. When the elevator is in use it will be appreciated that the material to be elevated and loaded into the truck is shoveled or dumped into the hopper 29 to be picked up by the elevator buckets 15, these buckets elevating the material to and dumping it on the conveyor 10, by which the material is conveyed lengthwise of the truck body to be distributed or trimmed therein.

It will be seen, therefore, that my invention provides an apparatus adapted to be applied to a truck body, for instance, and comprising an elevating mechanism and conveying mechanism, the conveyor mechanism receiving the material elevated by the elevator and distributing it within the truck body thereby eliminating the necessity of the load being trimmed by man power.

It will be appreciated also that the provision of this elevating mechanism also reduces the labor required to load the truck inasmuch as it is merely necessary to shovel or otherwise dump the material into the hopper 29.

What I claim is:—

1. In combination an elevator for attachment to a vehicle, a conveyor communicating therewith at the upper end of the elevator for receiving material from the elevator and distributing it along the interior of the vehicle body, a drive shaft for the conveyor, a driving and supporting sprocket for the elevator fixed to said shaft, a conveyor tube, and an idler sprocket rotatably mounted on said tube for supporting one side of the upper end of said elevator.

2. In combination an elevator for attachment to a vehicle and comprising spaced supporting and driving chains, elevator buckets suspended therefrom, upper and lower sprockets supporting said chains, a conveyor having its receiving end adjacent the upper end of said elevator to receive material from said elevator, said conveyor extending lengthwise of the body of the vehicle and distributing the material received from the elevator within the vehicle body, a drive shaft for said conveyor, a fixed bearing for one of said upper elevator sprockets, the other of said upper sprockets being fixed to said drive shaft to provide a drive for the elevator from the conveyor drive shaft.

3. In combination an elevator for attachment to a vehicle, a housing therefor, a hinged hopper adjacent the lower end of said housing, upper and lower supporting sprockets for the elevator, a conveyor adjacent the upper end of the elevator, the end of said conveyor entering said housing, a plate within said housing and inclining toward said conveyor, for receiving material dumped by said elevator and conducting it to the said conveyor, a drive shaft for the conveyor, one of said upper supporting sprockets being fixed to said shaft.

This specification signed this 15th day of January, 1931.

LEONARD C. SMITH.